(12) United States Patent
Hsieh et al.

(10) Patent No.: US 9,193,001 B2
(45) Date of Patent: Nov. 24, 2015

(54) WELDING JIG AND WELDING PROCESS FOR PLANAR MAGNETIC COMPONENTS

(75) Inventors: Chung-Kuang Hsieh, Hunan Province (CN); Lan Guo, Hunan Province (CN); Kao-Kuan Fan, Hunan Province (CN); Hui-Hua Teng, Taoyuan Hsien (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 581 days.

(21) Appl. No.: 13/417,336

(22) Filed: Mar. 12, 2012

(65) Prior Publication Data
US 2013/0082042 A1   Apr. 4, 2013

(30) Foreign Application Priority Data
Sep. 30, 2011   (CN) .......................... 2011 1 0295912

(51) Int. Cl.
| | | |
|---|---|---|
| *B21J 13/08* | (2006.01) | |
| *B23K 1/00* | (2006.01) | |
| *B23K 3/08* | (2006.01) | |
| *B23K 37/04* | (2006.01) | |

(52) U.S. Cl.
CPC .............. *B23K 1/0016* (2013.01); *B23K 3/087* (2013.01); *B23K 37/0408* (2013.01); *B23K 2201/38* (2013.01)

(58) Field of Classification Search
CPC ... B23K 2201/38; B23K 3/087; B23K 1/0016
USPC ........ 429/99; 219/158, 159, 161, 85.1, 85.18, 219/85.19; 228/44.7, 47.1; 269/8; 432/11, 432/5, 6, 152, 253
See application file for complete search history.

(56) References Cited

U.S. PATENT DOCUMENTS

| | | | | | |
|---|---|---|---|---|---|
| 3,643,190 | A | * | 2/1972 | Puetz et al. .................... | 335/132 |
| 4,175,810 | A | * | 11/1979 | Holt et al. ........................ | 439/82 |
| 4,582,309 | A | * | 4/1986 | Moxon et al. .................. | 269/303 |
| 4,802,862 | A | * | 2/1989 | Seidler ............................ | 439/83 |
| 4,873,757 | A | * | 10/1989 | Williams ...................... | 29/602.1 |
| 5,154,621 | A | * | 10/1992 | Legrady .......................... | 439/82 |
| 5,611,478 | A | * | 3/1997 | Asanasavest .............. | 228/110.1 |
| 6,000,128 | A | * | 12/1999 | Umeno et al. .................. | 29/846 |

(Continued)

FOREIGN PATENT DOCUMENTS

| | | | | | |
|---|---|---|---|---|---|
| CN | | 2693396 Y | * | 4/2005 | ............... B23K 3/08 |
| TW | | M302766 U | | 12/2006 | |

(Continued)

*Primary Examiner* — Dana Ross
*Assistant Examiner* — Joseph Iskra
(74) *Attorney, Agent, or Firm* — CKC & Partners Co., Ltd.

(57) ABSTRACT

A welding jig and welding process for planar magnetic components are provided. The welding jig includes a fixed piece and an elastic piece. The fixed piece includes a base and a carrier. The base has an opening, bumps at the bottom of the opening and a pair of operation ends extending from the opening. The carrier is fixed on the base and located in the opening, and has multiple through holes. When the bumps are located respectively in the through holes, an accommodation interval is formed between adjacent pairs of the bumps for the placement of the planar magnetic components. The elastic piece is secured to the fixed piece, and when the planar magnetic components are placed in the accommodation intervals of the fixed piece, the elastic piece covers the planar magnetic components and the planar magnetic components abut against two side edges of the elastic piece.

20 Claims, 8 Drawing Sheets

(56) References Cited

U.S. PATENT DOCUMENTS

| | | | |
|---|---|---|---|
| 6,086,386 A * | 7/2000 | Fjelstad et al. | 439/70 |
| 6,588,090 B1 * | 7/2003 | Kendall et al. | 29/602.1 |
| 2005/0197797 A1 * | 9/2005 | Dowland et al. | 702/115 |

FOREIGN PATENT DOCUMENTS

| | | |
|---|---|---|
| TW | M321824 U | 11/2007 |
| TW | 201036011 A | 10/2010 |

* cited by examiner

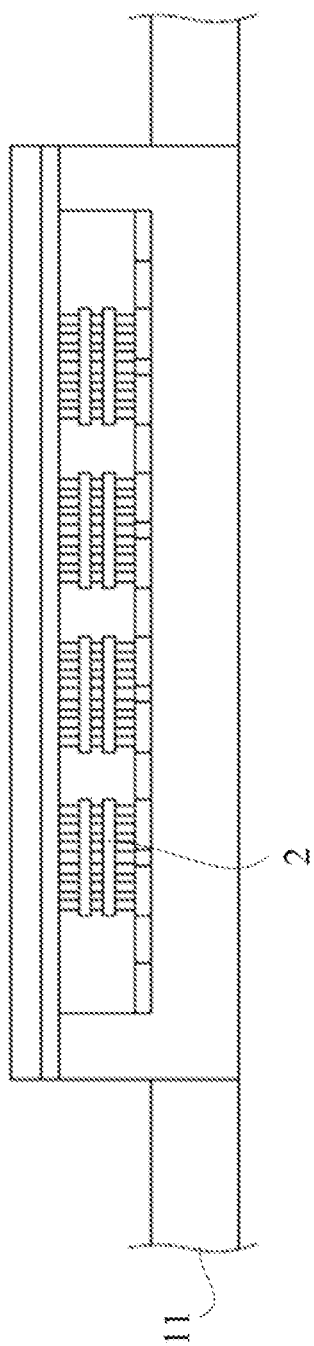

WELDING JIG AND WELDING PROCESS FOR PLANAR MAGNETIC COMPONENTS

RELATED APPLICATIONS

This application claims priority to Chinese Application Serial Number 201110295912.2, filed Sep. 30, 2011, which is herein incorporated by reference.

BACKGROUND

1. Field of Invention

The invention relates to welding. More particularly, the invention relates to a novel welding jig and welding process for planar magnetic components.

2. Description of Related Art

Compared with the traditional transformer, a planar magnetic component, such as a planar transformer, employs a material such as a single layer or multilayer printed wiring board (PWB) or copper foil to replace copper wires found in the traditional transformer. The wires in the planar transformer actually are planar conductors, and the current tends to flow at the edges far away from the center but totally passes through the conductor, so that a high current density can be obtained. In addition, the magnetic core applied in the planar transformer has a small volume, large area and flat shape, thereby achieving a good heat dissipation effect and obtaining a high efficiency. Furthermore, the planar transformer has the advantages of a compact structure, good coupling effect, small leakage inductance, excellent insulation performance and the like, so that the planar transformer conforms to modern trends of product miniaturization and high power density. As a result of these advantages, the planar transformer has been applied in many fields.

FIG. 7 is a front view of a PIN needle for a planar magnetic component in the prior art. As shown in FIG. 7, the PIN needle 73 in the prior art is formed in a straight columnar configuration. The method for fabricating the planar magnetic component using the PIN needle in the prior art generally includes providing a semi-finished planar magnetic component and then inserting the PIN needle into a PIN pin of a PWB of the planar magnetic component, after which this assembly is placed into a jig. Thereafter, the junction of the PIN needle and PIN pin is soldered at the front and back sides of the planar magnetic component using a soldering iron. This is repeated for a plurality of PIN needles and PIN pins, in which only one end of one PIN pin is soldered at a time for each soldering operation. Finally, the unnecessary part of each PIN needle is cut off. Such a method for fabricating the planar magnetic component has at least the following disadvantages:

1) Manual soldering using the soldering iron is time-consuming, and only a small operating space is provided for this operation.

2) Manual soldering using the soldering iron is performed only on one end of each PIN pin at a time. This reduces the speed of the production line.

3) Manual soldering is performed by a human which increases labor costs.

4) During the cutting of the PIN needles, the solder on the PWB may crack. This may be the source of quality problems in follow-up processes.

In view of the above, those in the industry are endeavoring to design a welding jig and welding process for planar magnetic components in a manner that results in a reduction in manufacturing time and labor costs associated with the PIN pin welding process of the planar magnetic component, and also that eliminates quality problems associated with the cracking of solder on a PWB.

SUMMARY

To solve the technical problems above, the invention aims to provide a welding jig for planar magnetic components, which includes a fixed piece and an elastic piece. The fixed piece includes a base and a carrier. The base has an opening, multiple uniformly-spaced bumps at the bottom of the opening and a pair of operation ends respectively extending from both sides of the opening. The carrier is fixed on the base and located in the opening of the base. The carrier has multiple through holes corresponding to the bumps. When the bumps are located respectively in the through holes, an accommodation interval is formed between adjacent pairs of the bumps for placement of the planar magnetic components. The elastic piece is secured to the fixed piece, and when the planar magnetic components are placed in the accommodation intervals of the fixed piece, the elastic piece covers the planar magnetic components and the planar magnetic components abut against inner sides of two side edges of the elastic piece.

In some embodiments, each of the operation ends has a bolt provided near the opening, the elastic piece has a pair of first penetration holes respectively at ends thereof for the bolt to extend into respectively, and the bolts extend respectively into the first penetration holes and are screwed respectively into nuts to fix the elastic piece on the fixed piece.

In some embodiments, the welding jig further includes a batten located on the elastic piece, and having a pair of second penetration holes respectively on opposite ends thereof. The second penetration holes and the first penetration holes are respectively co-axial to allow for extension of the bolts therethrough, and for each corresponding pair of one of the first penetration holes and one of the second penetration holes, one of the bolts extends therethrough and is screwed into one of the nuts to fix the batten and the elastic piece on the fixed piece.

In some embodiments, the welding jig is clamped onto the base of the fixed piece and the batten by a clip to fix the welding jig in the clip, and the clip is fixed in a solder pot for soldering the planar magnetic components.

In some embodiments, the carrier is screw-coupled to the base.

In some embodiments, the two side edges of the elastic piece are arc-shaped.

In some embodiments, the material of the carrier and the elastic piece is metal.

In some embodiments, the material of the carrier and the elastic piece is titanium alloy.

In some embodiments, the planar magnetic component has a printed wiring board (PWB), the PWB has multiple PIN pins, and each PIN pin has an electrically conductive PIN needle penetrating therethrough. The PIN needle includes multiple segments, and at least two of the multiple segments have different radial widths, so that before the soldering operation, the PIN needle is preliminarily fixed in the PIN pin through at least one of the multiple segments.

In some embodiments, the PIN needle sequentially includes a first segment, a second segment and a third segment. The radial width of the third segment is greater than the radial width of the second segment, and the radial width of the second segment is greater than the radial width of the first segment.

In some embodiments, the second segment of the PIN needle is used for preliminarily fixing the PIN needle on the PIN pin.

In some embodiments, the PIN needle includes a first segment and a second segment. The radial width of the second segment is greater than the radial width of the first segment.

In some embodiments, the second segment is used for preliminarily fixing the PIN needle on the PIN pin.

In some embodiments, the second segment is tapered.

In some embodiments, the second segment is stamp-shaped.

In some embodiments, each segment of the PIN needle is integrally formed.

In some embodiments, the planar magnetic component is a planar transformer, a planar inductor or a planar filter.

The invention also provides a welding process adapted for welding PIN pins on a PWB of a planar magnetic component. The welding process includes the following steps:

a) Multiple electrically conductive PIN needles are inserted respectively into multiple PIN pins on the PWB. Each PIN needle includes multiple segments, and at least two of the multiple segments have different radial widths and the PIN needle is preliminarily fixed in the PIN pin through at least one of the multiple segments.

b) The planar magnetic component with the PIN needles inserted therein is placed into a pressing machine for flat-pressing the PIN pins, so that the PIN needles extend into the PIN pins and both ends of the PIN needles are aligned with both ends of the PIN pins.

c) The flat-pressed planar magnetic component is placed into a soldering jig.

d) The soldering jig with the planar magnetic component placed therein is placed into a solder pot to perform a soldering operation, so as to make the PIN needles electrically contact the corresponding PIN pins.

In some embodiments, between the step a) and the step b), the welding process further includes placing the planar magnetic component with the PIN needles inserted therein into a fixed jig for fixing the PWB of the planar magnetic component.

In some embodiments, between the step c) and the step d), the welding process further includes clamping the welding jig by a clip and fixing the clip in the solder pot for soldering the planar magnetic components.

As described above, the welding jig and welding process for soldering the PIN pins and PIN needles of the planar magnetic component of the invention can save time and labor costs. Moreover, the planar magnetic component fabricated by soldering the PIN pins and PIN needles of the planar magnetic component using the welding jig and welding process can also eliminate quality problems in the follow-up process of the planar magnetic component encountered in the prior art as a result of solder cracks generated during the cutting of the PIN needles.

BRIEF DESCRIPTION OF THE DRAWINGS

In order to make the foregoing as well as other aspects, features, advantages, and embodiments of the invention more apparent, the accompanying drawings are described as follows:

FIGS. 1A to 1C are schematic views showing different stages of assembly of planar magnetic components in the welding jig;

DETAILED DESCRIPTION

The invention will be described in the following embodiments with reference to the accompanying drawings. However, the embodiments are not intended to limit the invention. Moreover, it is not intended for the description of operation to limit the order of implementation. Any device with equivalent functions that is produced from a structure formed by a recombination of elements shall fall within the scope of the invention. In addition, the drawings are only illustrative and are not drawn to the original size.

The terminology "about," "approximately" or "substantially" in this specification generally refers to an error or range of a value within 20%, preferably within 10% and more preferably within 5%. If not specifically explained, the value is regarded as an approximate value, i.e., within an error or range covered by "about," "approximately" or "substantially."

Figure 1:
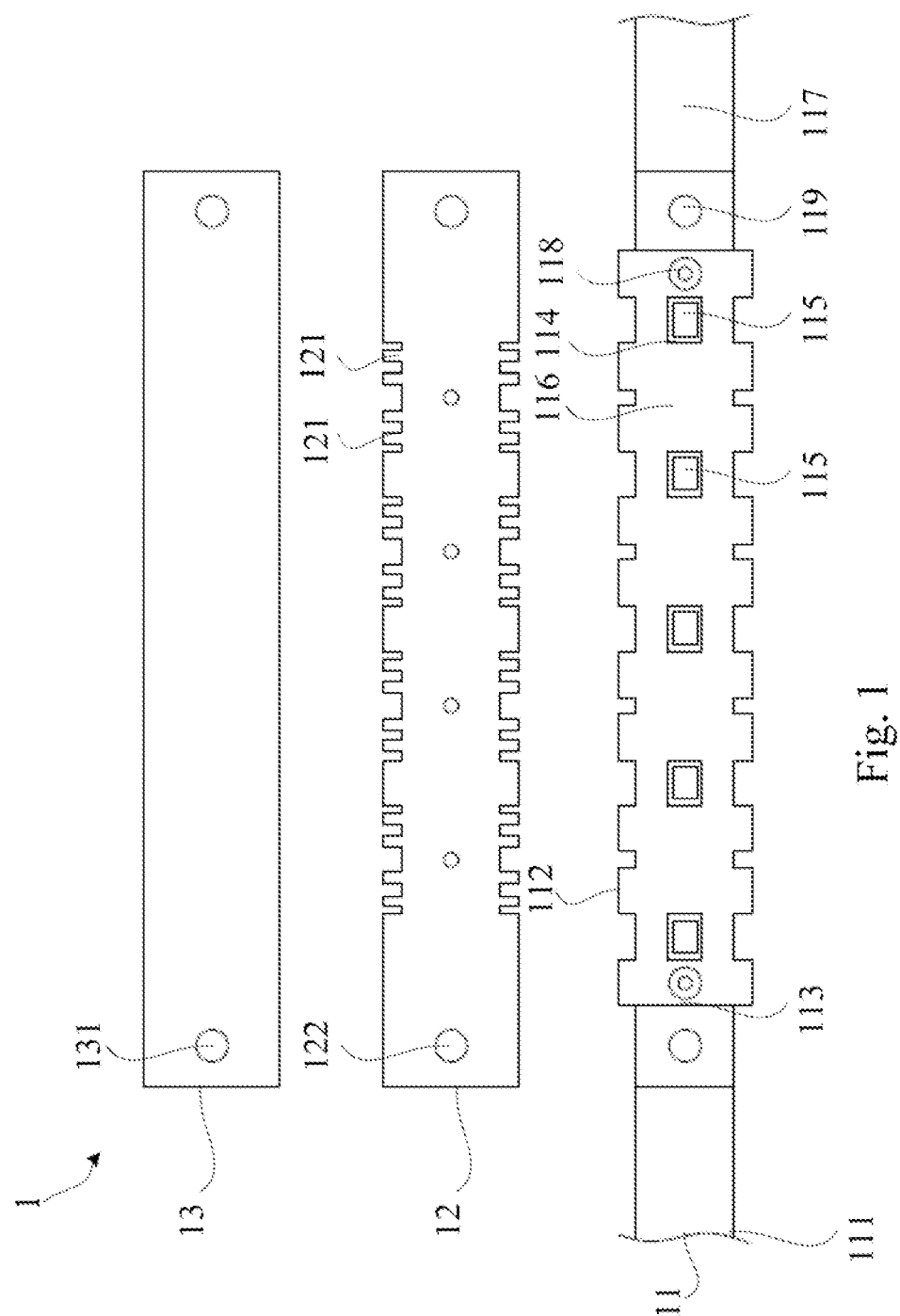
FIG. 1 is an exploded view of a welding jig according to an embodiment of the invention.
Figure 1A:
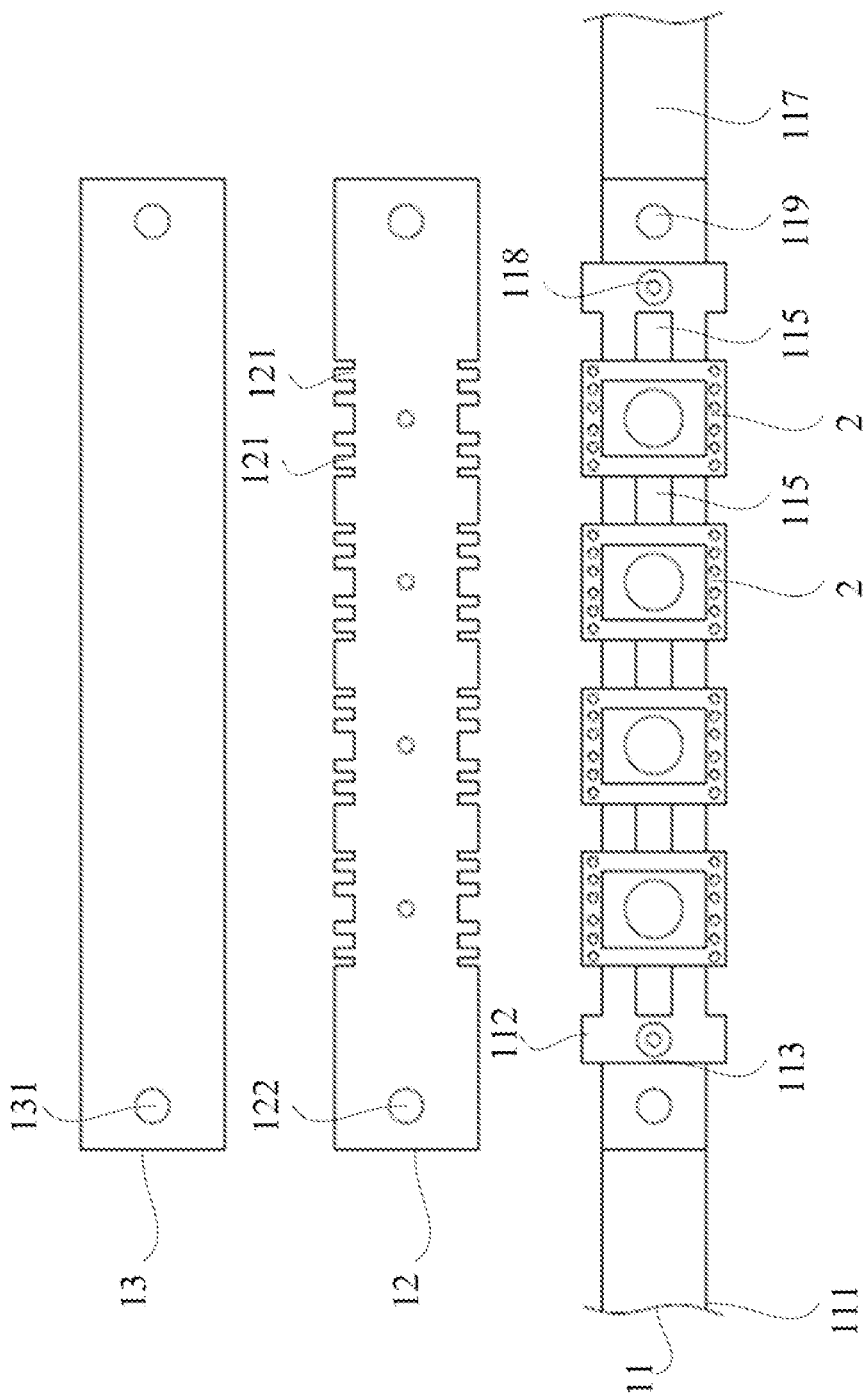
Figure 1B:

FIG. 1 is an exploded view of a welding jig according to an embodiment of the invention, and FIGS. 1A to 1C are schematic views showing different stages of assembly of planar magnetic components in the welding jig.

In this embodiment, the soldering jig 1 is adapted for planar magnetic components 2: Particularly, each planar magnetic component 2 has multiple PIN pins, each PIN pin has a PIN needle extending therethrough, and the PIN pins and the PIN needles corresponding to the PIN pins are electrically connected by soldering.

In this embodiment, the welding jig 1 includes a fixed piece 11 and an elastic piece 12. The fixed piece 11 includes a base 111 and a carrier 112. The base 111 has an opening 113, multiple uniformly-spaced bumps 115 at the bottom of the opening 113, and a pair of operation ends 117 respectively extending from both sides of the opening 113. The carrier 112 is fixed on the base 111 and is located in the opening 113 of the base 111. The carrier 112 has multiple through holes 114 corresponding to the bumps 115. When the bumps 115 are located respectively in the through holes 114, an accommodation interval 116 is formed between adjacent pairs of the bumps 115 for the placement of the planar magnetic components 2 respectively. The elastic piece 12 is secured to the fixed piece 11. When the planar magnetic components 2 are placed in the accommodation intervals 116 of the fixed piece 11, the elastic piece 12 covers the planar magnetic components 2 and the planar magnetic components 2 abut against inner sides of two side edges 121 of the elastic piece 12.

It should be noted that FIG. 1 illustrates five through holes 114 and five bumps 115 corresponding to the through holes 114, and a total of four accommodation intervals 116 are formed between adjacent pairs of the five bumps 115. However, the invention is not limited to this configuration. That is, the number of the through holes 114 and the bumps 115 corresponding to the through holes 114 may be greater or less than five, and accordingly, the number of the accommodation intervals 116 may also be greater or less than four.

In this embodiment, each of the operation ends 117 has a bolt 119 provided near the opening 113, and correspondingly, the elastic piece 12 has a pair of first penetration holes 122 respectively at ends thereof for the bolts 119 to extend into respectively. The bolts 119 extend respectively into the first penetration holes 122 and are screwed respectively into nuts (not shown) to fix the elastic piece 12 on the fixed piece 11.

In this embodiment, the soldering jig 1 may further include a batten 13 located on the elastic piece 12. The batten 13 has a pair of second penetration holes 131 respectively on opposite ends thereof. The second penetration holes 131 and the first penetration holes 122 are co-axial to allow for extension of the bolts 119 therethough. That is, for each corresponding pair of one of the first penetration holes 122 and one of the second penetration holes 131, one of the bolts 119 extends therethough and is screwed into one of the nuts to fix the batten 13 and the elastic piece 12 on the fixed piece 11. However, it should be noted that the batten 13 may be omitted from the configuration of the welding jig 1 in some other embodiments.

In this embodiment, the carrier 112 and the base 111 are fixed by screws 118. That is, the carrier 112 and the base 111 are connected to each other using a screw coupling configuration. However, the invention is not limited to such a configuration, and the carrier 112 and the base 111 may be fixed in other ways.

In this embodiment, the two side edges 121 of the elastic piece 12 are arc-shaped, so that the planar magnetic components 2 abut securely against the side edges 121.

In this embodiment, the material of the carrier 112 and the elastic piece 12 is metal, and in some embodiments, is titanium alloy. However, the invention is not limited to in this regard. In this embodiment, a magnetic metal may be used for the material of the center part in the accommodation intervals 116 of the carrier 112, so as to form an attraction relationship with the planar magnetic components 2. As a result, the planar magnetic components 2 are better secured to the carrier 112.

The process of assembling the planar magnetic components 2 in the welding jig 1 is described in detail below.

First, multiple planar magnetic components 2 are correspondingly placed in multiple accommodation intervals 116 (as shown in FIG. 1A). At this time, each of the planar magnetic components 2 is located between two bumps 115 and abuts against the bumps 115.

Subsequently, the elastic piece 12 is placed on the fixed piece 11 (as shown in FIG. 1B). Particularly, the penetration holes 122 of the elastic piece 12 are aligned with the bolts 119 located in the fixed piece 11, to allow the bolts 119 to extend into the penetration holes 122. At this time, the inner sides of the two side edges 121 of the elastic piece 12 abut against the planar magnetic components 2. Since the planar magnetic components 2 abut against the bumps 115 and the inner sides of the two side edges 121 of the elastic piece 12, the planar magnetic components 2 are not easily moved. Furthermore, in this embodiment, the side edges 121 of the elastic piece 12 are arc-shaped.

Next, the batten 13 is placed on the elastic piece 12 and is fixed on the elastic piece 12 (as shown in FIG. 1C). Particularly, the penetration holes 131 of the batten 13 are aligned with the penetration holes 122 of the elastic piece 12 and the bolts 119 of the fixed piece 11, so that the bolts 119 extend into the penetration holes 122 and 131 and are screwed into the nuts. As a result, both the batten 13 and the elastic piece 12 are secured to the fixed piece 11.

Thereafter, in this embodiment, the welding jig 1 with the planar magnetic components 2 placed therein can be clamped by a clip. Particularly, the welding jig 1 is clamped onto the base 111 of the fixed piece 11 and the batten 13 by the clip to fix the welding jig 1 in the clip.

Next, the clip is fixed in a solder pot for soldering the PIN pins of the planar magnetic components 2.

In this embodiment, the soldering jig 1 is used to realize multiple soldering of the PIN pins of the planar magnetic components 2 in the solder pot.

Figure 2:
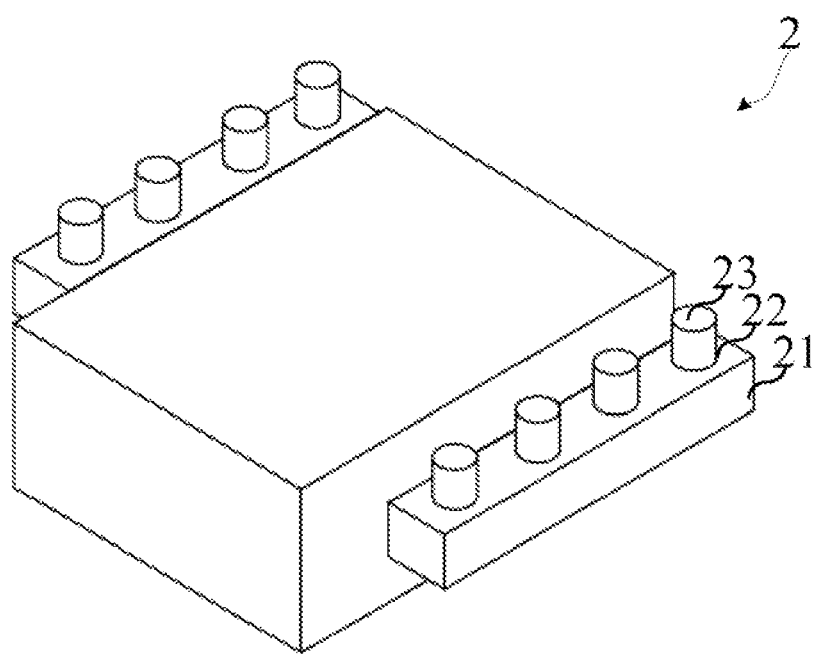
FIG. 2 is a perspective view of a planar magnetic component according to an embodiment of the invention.

FIG. 2 is a perspective view of a planar magnetic component according to an embodiment of the invention. As shown in FIG. 2, the planar magnetic component 2 has a printed wiring board (PWB) 21. The PWB 21 has multiple PIN pins 22, and each PIN pin 22 has an electrically conductive PIN needle 23 disposed therein. In this embodiment, the planar magnetic components 2 may be any electronic component like a planar transformer, a planar inductor or a planar filter.

Figure 3:
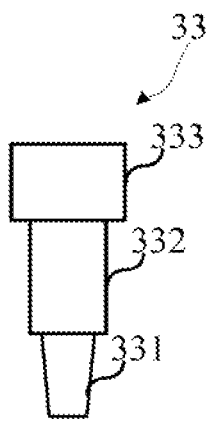
FIG. 3 is a front view of a PIN needle in FIG. 2 according to an embodiment of the invention.

FIG. 3 is a front view of a PIN needle in FIG. 2 according to an embodiment of the invention. As shown in FIG. 3, the PIN needle 33 includes a segment 331, a segment 332 and a segment 333, and the PIN needle 33 may be referred to as a three-segment type PIN needle. The radial width of the segment 332 is greater than the radial width of the segment 331, and the radial width of the segment 333 is greater than the radial width of the segment 332.

In this embodiment, after the PIN needle 33 is inserted in the corresponding PIN pin 22 (as shown in FIG. 2), the segment 332 may be preliminarily fixed in the PIN pin 22.

In this embodiment, the segment 331 is cylindrical and tapered, and the segment 332 and segment 333 are cylindrical with no tapering. In some other embodiments, each of the segment 331, the segment 332 and the segment 333 is cylindrical with no tapering, or the segment 331, the segment 332 and the segment 333 may be formed using a combination of other shapes. The invention is not limited in this regard.

In this embodiment, the segment 331, the segment 332 and the segment 333 are integrally formed.

In this embodiment, the length of the PIN needle 33 is approximately equal to that of the PIN pin 22. In some other embodiments, the length of the PIN needle 33 is greater than that of the PIN pin 22.

Figure 4:
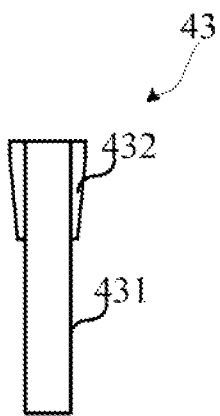
FIG. 4 is a front view of the PIN needle in FIG. 2 according to another embodiment of the invention.

FIG. 4 is a front view of the PIN needle in FIG. 2 according to another embodiment of the invention. As shown in FIG. 4, the PIN needle 43 includes a segment 431 and a segment 432. The radial width of the segment 432 is greater than the radial width of the segment 431.

In this embodiment, after the PIN needle 43 is inserted into the corresponding PIN pin 22 (as shown in FIG. 2), the segment 432 may be preliminarily fixed in the PIN pin 22.

In this embodiment, the segment 432 is tapered. In some other embodiments, the segment 432 may be formed using other shapes.

In this embodiment, the segment 431 and the segment 432 are integrally formed.

In this embodiment, the length of the PIN needle 43 is approximately equal to that of the PIN pin 22. In some other embodiments, the length of the PIN needle 43 is greater than that of the PIN pin 22.

Figure 5:
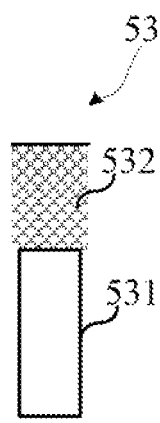
FIG. 5 is a front view of the PIN needle in FIG. 2 according to yet another embodiment of the invention.

FIG. 5 is a front view of the PIN needle in FIG. 2 according to yet another embodiment of the present invention. As shown in FIG. 5, the PIN needle 53 includes a segment 531 and a segment 532. The radial width of the segment 532 is greater than the radial width of the segment 531. The segment 531 and the segment 532 are integrally formed.

The difference between the PIN needle 53 of this embodiment and the PIN needle 43 of the embodiment shown in FIG.

4 is that the shape of the segment 532 is different from the shape of the segment 432. That is, the segment 532 is stamp-shaped, which is different from the segment 432 that is tapered. In this embodiment, after the PIN needle 53 is inserted into the corresponding PIN pin 22 (as shown in FIG. 2), the segment 532 is preliminarily fixed in the PIN pin 22.

In this embodiment, the length of the PIN needle 53 is approximately equal to that of the PIN pin 22. In some other embodiments, the length of the PIN needle 53 may be greater than that of the PIN pin 22.

Figure 6:
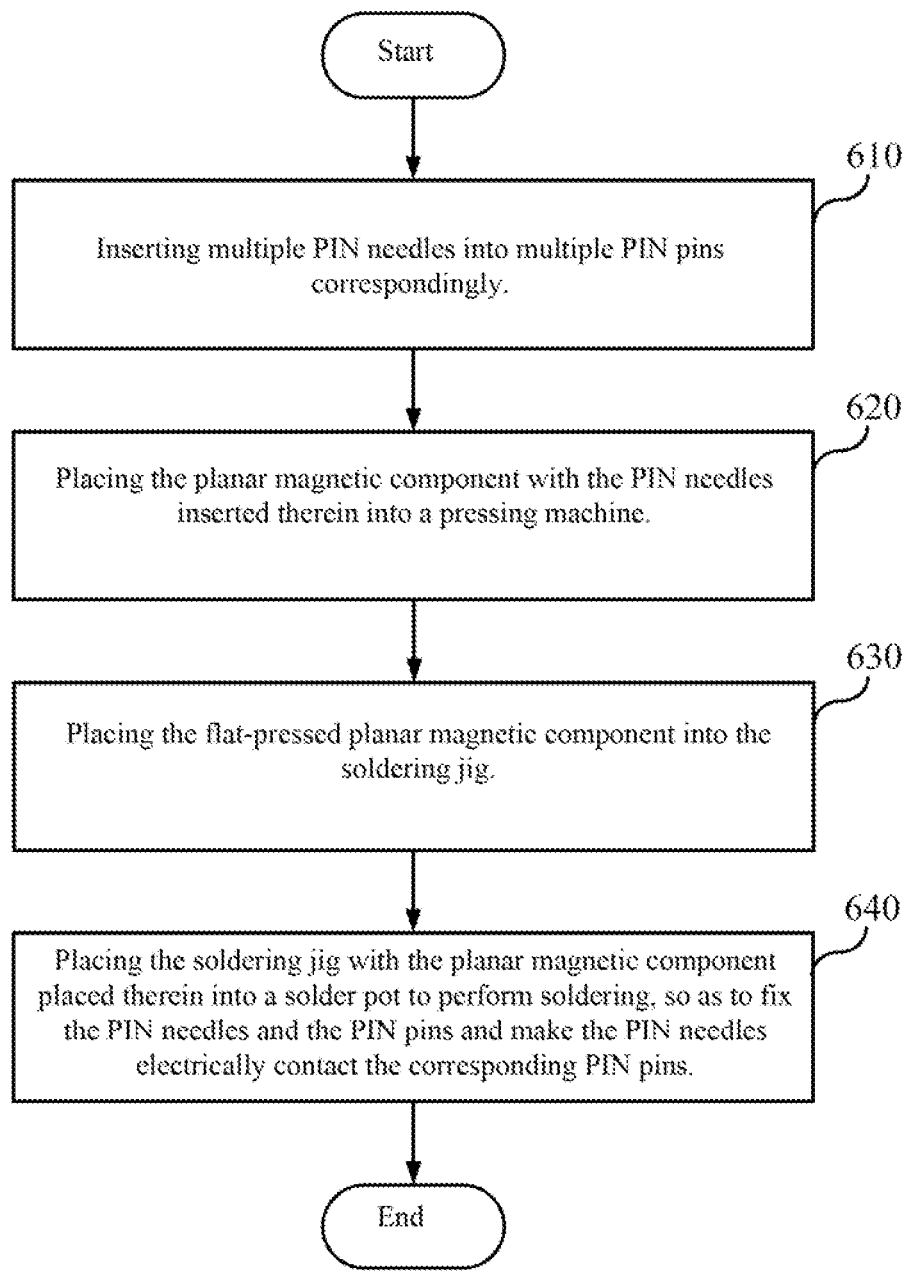
FIG. 6 is a flow chart of a welding process according to an embodiment of the invention.
Figure 7:
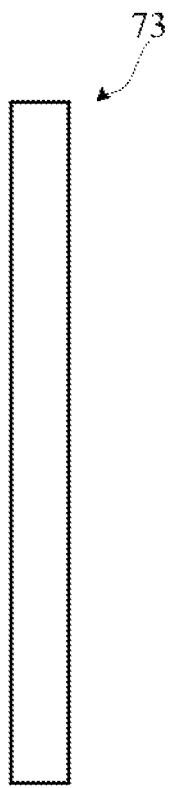
FIG. 7 is a front view of a PIN needle for a planar magnetic component in the prior art.

FIG. 6 is a flow chart of a welding process according to an embodiment of the invention.

In this embodiment, in the welding process, the welding is performed on the PIN pins on the PWB of the planar magnetic component.

In this embodiment, the PIN needle in FIG. 3 is used as an example for illustration, but the welding process of the invention is not limited in this regard. For example, the PIN needles in FIG. 4 and FIG. 5 may also be used for the welding process.

Hereinafter, referring to FIG. 1, FIGS. 1A to 1C, FIG. 2, FIG. 3 and FIG. 6 together, the welding process for soldering the PIN pins of the planar magnetic components 2 is described in detail.

First, in step 610, multiple PIN needles 33 are inserted into multiple PIN pins 22 respectively. In this embodiment, the segments 332 of the PIN needles 33 are preliminarily fixed in the PIN pins 22 respectively, so that the PIN needles 33 can be preliminarily fixed respectively in the PIN pins 22.

Thereafter, in step 620, the planar magnetic component 2 with the PIN needles 33 inserted therein is placed in a pressing machine (not shown), and the pressing machine performs a flat-pressing process on the multiple PIN needles 33, so as to make the PIN needles 33 extend into the PIN pins 22 and to align both ends of the PIN needles 33 with both ends of the PIN pins 22.

Subsequently, in step 630, the flat-pressed planar magnetic component 2 is placed in the soldering jig 1.

Finally, in step 640, the soldering jig 1 with the planar magnetic component 2 placed therein is placed into a solder pot (not shown) to perform soldering, so as to fix the PIN needles 33 and the PIN pins 22 and make the PIN needles 33 electrically contact the corresponding PIN pins 22. In this embodiment, during soldering, both ends of the PIN pins 22 may be soldered simultaneously.

In this embodiment, between the step 610 and the step 620, the planar magnetic component 2 with the PIN needles 33 inserted therein may be placed into a fixed jig (not shown) for fixing the PWB 21 of the planar magnetic components 2, so that in the subsequent process, the pressing machine performs flat-pressing on the PIN needles 33.

In this embodiment, between the step 630 and the step 640, the soldering jig 1 with the planar magnetic component 2 placed therein may be clamped by a clip, so that the soldering jig 1 is fixed in the clip. For fixing the soldering jig 1 more firmly, the soldering jig 1 may be clamped by two or more clips, but the invention is not limited with respect to the number of the clips used.

In the prior art, soldering is performed manually using a soldering iron, and only one end of one PIN pin is soldered at a time. However, in this embodiment, since the planar magnetic component is fabricated by the PIN needles of the invention, both ends of multiple PIN pins may be soldered simultaneously in the solder pot. In the prior art, soldering cannot be directly performed in the solder pot because the PIN needles in the prior art may slide up and down in the PIN pins, which may result in poor welds or faulty welding. According to the PIN needle structure disclosed in the invention, the PIN needles may be preliminarily fixed in the PIN pins, and the PIN needles do not slide up and down when soldering in the solder pot. Moreover, when the length of the PIN needles is greater than that of the PIN pins, both ends of the PIN needles may be directly flat-pressed by the pressing machine, so as to align both ends of the PIN needles with both ends of the PIN pins, thereby achieving a certain flatness of the planar magnetic component. In addition, after soldering in the solder pot, the cutting operation for the PIN needles as performed in the prior art is not necessary in the invention, thereby avoiding the formation of solder cracks caused by such a cutting operation and eliminating quality problems of the planar magnetic component resulting from solder cracks.

Hereinafter, the advantages of the invention in comparison with the prior art are described using specific numerical parameters.

Assuming that one planar magnetic component (with a PWB) has ten PIN pins, if manual soldering is performed with a soldering iron, soldering on both ends of the PIN pins takes 0.5*2*10=10s and the cutting of the PIN needles takes 0.3*10=3s, so that the total time is 13s. That is, finishing the soldering of each PWB and cutting of the PIN needle take 13s.

If the three-segment type PIN needle disclosed in the invention is used and soldering is performed in a solder pot, soldering takes 2s each time, and five PWBs (in the planar magnetic component) may be soldered at a time. That is, soldering each PWB takes ⅖s, so that in comparison with the 13s in the prior art, the efficiency is increased by as much as 32.5 times. If the planar magnetic component includes more PIN pins, the efficiency is even higher.

In view of the above, the welding jig and welding process for soldering the PIN pins and the PIN needles of the planar magnetic component of the invention may save time and labor costs. Moreover, the planar magnetic component fabricated by soldering the PIN pins and PIN needles of the planar magnetic component using the welding jig and welding process eliminates quality problems in the follow-up processes of the planar magnetic component encountered in the prior art as a result of solder cracks generated during the cutting of the PIN needles.

In the above paragraphs, the specific embodiments of the invention are described with reference to the accompanying drawings. It will be understood by those of ordinary skill in the art that various modifications and variations can be made to the specific embodiments of the invention without departing from the scope and spirit of the invention. In view of the foregoing, it is intended that the modifications and variations of the invention fall within the scope of the following claims.

Although the invention has been disclosed with reference to the above embodiments, these embodiments are not intended to limit the invention. It will be apparent to those skilled in the art that various modifications and variations can be made without departing from the scope and spirit of the invention. Therefore, the scope of the invention shall be defined by the appended claims.

What is claimed is:

1. A welding jig for planar magnetic components, comprising:
   a fixed piece, comprising:
      a base having an opening, multiple uniformly-spaced bumps at the bottom of the opening and a pair of operation ends respectively extending from both sides of the opening; and
      a carrier fixed on the base and located in the opening of the base, the carrier having multiple through holes corresponding to the bumps, wherein the bumps are located respectively in the through holes, and an accommodation interval is formed between adjacent pairs of the bumps for placement of the planar magnetic components; and an elastic piece directly secured to the fixed piece, wherein the planar magnetic components are placed in the accommodation intervals of the fixed piece, and the elastic piece covers the planar magnetic components and the planar magnetic components directly abut against inner sides of two side edges of the elastic piece.

2. The welding jig of claim 1, wherein each of the operation ends has a bolt provided near the opening, the elastic piece has a pair of first penetration holes respectively at ends thereof for the bolt to extend into respectively, and the bolts extend respectively into the first penetration holes and are screwed respectively into nuts to fix the elastic piece on the fixed piece.

3. The welding jig of claim 2, further comprising:
a batten located on the elastic piece and having a pair of second penetration holes respectively on opposite ends thereof, wherein the second penetration holes and the first penetration holes are respectively co-axial to allow for extension of the bolts therethrough, and for each corresponding pair of one of the first penetration holes and one of the second penetration holes, one of the bolts extends therethrough and is screwed into one of the nuts to fix the batten and the elastic piece on the fixed piece.

4. The welding jig of claim 3, wherein the welding jig is clamped onto the base of the fixed piece and the batten by a clip to fix the welding jig in the clip, and the clip is fixed in a solder pot for soldering the planar magnetic components.

5. The welding jig of claim 1, wherein the carrier is screw-coupled to the base.

6. The welding jig of claim 1, wherein the two side edges of the elastic piece are arc-shaped.

7. The welding jig of claim 1, wherein the material of the carrier and the elastic piece is metal.

8. The welding jig of claim 7, wherein the material of the carrier and the elastic piece is titanium alloy.

9. The welding jig of claim 1, wherein the planar magnetic component has a printed wiring board (PWB), the PWB has multiple PIN pins, each PIN pin has an electrically conductive PIN needle penetrating therethrough, the PIN needle comprises multiple segments, and at least two of the multiple segments have different radial widths, so that before the soldering operation, the PIN needle is preliminarily fixed in the PIN pin through at least one of the multiple segments.

10. The welding jig of claim 9, wherein the PIN needle sequentially comprises a first segment, a second segment and a third segment, wherein the radial width of the third segment is greater than the radial width of the second segment, and the radial width of the second segment is greater than the radial width of the first segment.

11. The welding jig of claim 10, wherein the second segment of the PIN needle is used for preliminarily fixing the PIN needle on the PIN pin.

12. The welding jig of claim 9, wherein the PIN needle comprises a first segment and a second segment, wherein the radial width of the second segment is greater than the radial width of the first segment.

13. The welding jig of claim 12, wherein the second segment is used for preliminarily fixing the PIN needle on the PIN pin.

14. The welding jig of claim 12, wherein the second segment is tapered.

15. The welding jig of claim 12, wherein the second segment is stamp-shaped.

16. The welding jig of claim 9, wherein each segment of the PIN needle is integrally formed.

17. The welding jig of claim 9, wherein the planar magnetic component is a planar transformer, a planar inductor or a planar filter.

18. A welding process for planar magnetic components using the welding jig of claim 1, adapted for welding PIN pins on a Printed wiring board (PWB) of the planar magnetic component, comprising:
a) inserting multiple electrically conductive PIN needles respectively into multiple PIN pins on the PWB, wherein each PIN needle comprises multiple segments, at least two of the multiple segments have different radial widths and the PIN needle is preliminarily fixed in the PIN pin through at least one of the multiple segments;
b) placing the planar magnetic component with the PIN needles inserted therein into a pressing machine for flat-pressing the PIN pins, so that the PIN needles extend into the PIN pins and both ends of the PIN needles are aligned with both ends of the PIN pins;
c) placing the flat-pressed planar magnetic component into the welding jig of claim 1; and
d) placing the welding jig with the planar magnetic component placed therein into a solder pot to perform a soldering operation, so as to make the PIN needles electrically contact the corresponding PIN pins.

19. The welding process of claim 18, wherein between the step a) and the step b), further comprising:
placing the planar magnetic component with the PIN needles inserted therein into a fixed jig for fixing the PWB of the planar magnetic component.

20. The welding process of claim 18, wherein between the step c) and the step d), further comprising:
clamping the welding jig by a clip and fixing the clip in the solder pot for soldering the planar magnetic components.

* * * * *